United States Patent [19]

Hashemi et al.

[11] Patent Number: 5,254,149
[45] Date of Patent: Oct. 19, 1993

[54] PROCESS FOR DETERMINING THE QUALITY OF TEMPER OF A GLASS SHEET USING A LASER BEAM

[75] Inventors: Amin H. Hashemi, Farmington; Timothy L. Kelly, Ann Arbor, both of Mich.

[73] Assignee: Ford Motor Company, Dearborn, Mich.

[21] Appl. No.: 864,279

[22] Filed: Apr. 6, 1992

[51] Int. Cl.$^5$ ............................................. C03B 32/00
[52] U.S. Cl. .......................................... 65/29; 73/760
[58] Field of Search ...................... 65/29; 73/760, 159, 73/788, 799; 219/121.67, 121.68, 121.69

[56] References Cited

U.S. PATENT DOCUMENTS 3,543,979  12/1970  Grove et al. ............................. 225/2

Primary Examiner—W. Gary Jones
Assistant Examiner—Steven P. Griffin
Attorney, Agent, or Firm—Lorraine S. Melotik; Roger L. May

[57] ABSTRACT

The quality of temper in a glass sheet is determined by repeatedly scoring the glass sheet with a laser beam, to incrementally penetrate the compression zone, until the glass sheet shatters.

11 Claims, No Drawings

PROCESS FOR DETERMINING THE QUALITY OF TEMPER OF A GLASS SHEET USING A LASER BEAM

FIELD OF THE INVENTION

This invention is directed to a process for determining the quality of temper of a glass sheet. More particularly, the invention is directed to a process for determining certain characteristics of the compression and tension zones of a tempered glass sheet, and thereby the quality of temper of the glass sheet.

BACKGROUND OF THE INVENTION

It is well-known that ceramic materials are much stronger in compression than in tension. Therefore, "tempered" glass is typically used for glass doors, vehicle glazings, and other high-strength-requirement applications. Residual compressive stresses are intentionally induced in tempered glass by heating a glass sheet to a temperature near its softening point, removing it from the heating furnace, and quickly directing blasts of a cooling fluid, such as air, toward the major surfaces of the glass sheet. The surface regions of the glass sheet contract because of the drop in temperature as a result of convective heat transfer to the cooling air. Thus, the major surface regions of the glass sheet become rigid, while the central portion of the glass sheet remains hot and can adjust its dimensions to the surface region contractions. When the central region of the glass sheet cools and contracts slightly at a later time, compressive stresses are produced in the major surface regions of the glass sheet. A constant cooling rate applied to both major surfaces of the glass sheet, resulting from an identical flow of constant-temperature cooling air to both major surfaces, theoretically would produce a parabolic stress distribution when measured normal to the major surfaces of the glass sheet.

Tempered glass is particularly useful for high-strength-requirement applications because the exposed surfaces of the tempered glass sheet are under residual compressive stress. Glass failure usually occurs under an applied tensile (rather than compressive) stress. Therefore, since failure in a glass sheet almost always is initiated at one of its major surfaces, e.g., by striking the glass sheet, any applied stress must first overcome the residual compression near the surface of the glass sheet before that region is brought into tension such that failure may occur.

It is generally known in the art of manufacturing automotive glazings to heat a glass sheet templet to a temperature above its plastic set temperature, usually about 1200° F., then form the templet to a desired curvature by either gravity forming or press bending the hot glass, and thereafter temper the formed glass templet by directing streams of a tempering fluid, usually moist air, against the major surfaces thereof. During the tempering operation, it is known to support the formed glass sheet on a support ring, comprising a rigid structure conforming generally in outline and elevation to the underside peripheral marginal surface of the formed glass sheet.

During the tempering operation, the blasts of tempering fluid rapidly cool the major surfaces of the formed glass sheet in all areas, except those areas near points of contact between the tempering support ring and the underside peripheral marginal surface of the glass sheet. In those areas, cooling is retarded due to the restricted flow of tempering fluid caused by interference with the tempering support ring. Thus, those areas of the ultimately produced glass sheet may be stressed in tension while the majority of the major surface area of the glass sheet is stressed in compression. This stress imbalance often leads to spontaneous breakage of the glass sheet during use in a motor vehicle.

Moreover, other variables in the tempering process can result in poor quality, nonuniform tempering, wherein the configuration of the actual stress distribution measured across the thickness of the glass sheet at any point along the surface of the glass sheet varies markedly from an idealized parabola. Clearly, the quality of temper induced into a glass sheet is difficult to control, and even more difficult to measure quantitatively.

It would be desirable to devise a method for determining the quality of the temper induced into a glass sheet. Such a method should be simple, and yet give consistent, reproducible results which could be used to control the tempering process and therefore the quality of the tempered glass sheet produced thereby.

SUMMARY OF THE INVENTION

Accordant with the present invention, there surprisingly has been discovered a process for determining the quality of temper of a glass sheet. The process comprises the steps of:

A) scoring a major surface of a tempered glass sheet with a laser beam; and

B) repeating step A a number of times sufficient to cause the glass sheet to shatter.

The process of the present invention is particularly well-suited for determining the quality of temper in an automotive glazing, which information can then be used as a quality control tool for modifying the operating conditions of the tempering process.

DETAILED DESCRIPTION OF THE PREFERRED EMBODIMENT

The present invention is directed to a process for determining the quality of tempering of a glass sheet. A surface of the glass sheet is scored by a laser beam set at a predetermined energy level. This scoring process is repeated a number of times (i.e., a number of scoring "passes" are made), until the glass sheet shatters. Data regarding the energy level of the laser beam, the number of times the glass sheet is scored, and the time interval between each scoring treatment may then be compared to an established matrix of empirical data which would indicate the quality of the temper.

The quality of temper in part is determined by several factors, including the thicknesses of the compression zones of the two major surfaces of the glass sheet relative to the thickness of the central tension zone, the thicknesses of the compression zones relative to each other, the uniformity of thickness of either or both of the compression zones, the average and maximum compressive and tensile stress values of the tempered glass sheet (usually expressed in psi), etc. A major concern in the vehicle glazing manufacturing industry is the uniformity of the compressive stress in the underside peripheral marginal surface compression zone where the glass sheet engages the tempering support ring. The compressive stress in this region often is very low due to the lack of an adequate flow of tempering fluid adjacent the underside peripheral marginal surface of the glass sheet caused by interference with the tempering support ring. The present invention allows a quantitative measurement of the stress induced into the glass sheet in this and other areas of the glass sheet.

A surface of the glass sheet is scored by a laser beam set at a predetermined energy level. By the term "laser", as it is used herein, it is meant a device capable of "light amplification by stimulated emission of radiation." Lasers are well-known in the art, and therefore will not be discussed in detail. As will be readily apparent to one ordinarily skilled in the art, the laser must be selected to produce an energy beam at a wavelength which is absorbed by the glass sheet. Useful wavelengths include, without limitation, those from about 0.1 to about 1,000 microns. Conveniently, the energy output for the laser may range over wide limits from about 10 watts to about 300 watts. Preferably, the energy output for use according to the present invention may range from about 10 watts to about 80 watts.

The inventive process requires that the surface of the glass sheet be scored a number of times. It is contemplated that the laser output energy may remain constant each time the glass sheet is scored, or may be set to a new value each time the glass sheet is scored, or may comprise any combination of constant and varying values. For example, the inventive method may include scoring the glass sheet using 30 pulses of constant-energy laser light, with a dwell time between pulses of 200 milliseconds, followed by a number of intermittent pulses of laser light having a lower energy level wherein the dwell time between each such intermittent pulse is about one minute. It also will be apparent to one ordinarily skilled in the art that the time intervals between each scoring pass may be constant, varied, or any combination thereof.

The surface of the glass sheet is scored by the laser a number of times, according to the present invention. By the term "score", as used herein, is meant a process whereby a small amount of the glass is obliterated by the laser energy. Thus, a bore or groove increasingly penetrates the surface of the glass sheet during each scoring pass. In the case where the laser beam remains motionless relative to the glass sheet during each scoring pass, a bore results in the glass surface. Where the laser beam is moved in a direction parallel to a major surface of the glass sheet, a groove is formed in the surface of the sheet. The terminology "laser beam is moved in a direction parallel to the surface of the glass sheet" is intended to include not only movement of the laser beam with respect to the glass sheet, but also movement of the glass sheet with respect to the laser beam, and any combination thereof. Thus, this terminology is intended generally to encompass relative movement between the laser beam and the glass sheet so as to result in the formation of a groove in the surface of the glass sheet. The bore or groove becomes deeper upon each scoring pass. By comparison, when a constant beam of laser energy is directed toward the surface of a glass sheet, as is conventionally done when laser beams are used to cut glass sheets into smaller pieces, a hole is drilled completely through the glass sheet, and the glass sheet then shatters when the perforated glass sheet cools.

Successive scoring passes cause the bore or groove to penetrate the compression zone of the exposed major surface of the glass sheet. While not wishing to be bound by any particular theory regarding the mechanism by which the scoring passes of the present invention cause the tempered glass sheet to shatter, it is believed that the scoring passes cause the glass sheet to shatter spontaneously when the bore or groove has penetrated the glass sheet to the interface between the compression and tensile zones. Therefore, the present invention could be used to determine empirically the depth of the compression zone at any location across the surface of the tempered glass sheet.

It is contemplated that the data derived from the method of the present invention may be compared to an established matrix of empirical data which would indicate the quality of the temper. For example, a large number of glass sheets which are identically tempered could be split into two groups. The first group could be subjected to the method of the present invention, to determine a set of conditions under which the tempered samples spontaneously shatter. The second group could be subjected to well-known tests for determining the acceptance or failure of tempered glass sheets based upon impact resistance, such as the tests set forth in the American National Standard Institute (ANSI) Safety Code for Safety Glazing Materials for Glazing Motor Vehicles Operating on Land Highways, No. Z26.1. Thereafter, other sets of test groups of tempered glass sheets produced under various tempering conditions could be made and tested as above, to form a matrix of empirical data which could then be used to indicate which glass sheets subjected to the destructive testing method of the present invention would have passed the ANSI Code. Utilizing this knowledge, the tempering conditions or tempering support ring materials and configuration could be modified accordingly, to produce a tempered glass sheet of high quality.

EXAMPLES

Three samples of identically tempered ¼ inch glass were subjected to identical scoring passes from a stationary laser. The laser beam was set at a power level of about 60 watts. The surface of each sample was initially scored with 30 pulses of energy, each pulse lasting 1 millisecond, with a dwell time of 200 milliseconds between each pulse. Thereafter, additional intermittent pulses were used to further score the glass sheet at one-minute intervals. The laser output energy was maintained at 60 watts, and each pulse was 1 millesecond in duration. Samples 1 and 2 each shattered following the 18th additional pulse; sample 3 shattered following the 17th additional pulse.

This example may be repeated with similar success by substituting the generically or specifically described test conditions recited herein for the ones actually used in the preceding Examples. Surprisingly, the present method provides consistent and repeatable indications of the quality of temper of the glass sheet.

From the foregoing description, one ordinarily skilled in the art can easily ascertain the essential characteristics of this invention, and without departing from the spirit and scope thereof, can make various changes and modifications to the invention to adapt it to various usages an conditions.

What is claimed is:

1. a process for determining temper quality in a glass sheet, comprising the steps of:
   A) scoring a major surface of a tempered glass sheet with a laser beam; and
   B) repeating step A a number of times sufficient to cause the glass sheet to shatter.

2. The process for determining temper quality in a glass sheet according to claim 1, wherein the laser beam is stationary with respect to the glass sheet.

3. The process for determining temper quality in a glass sheet according to claim 1, wherein the laser beam is moved in a direction parallel to the major surface of the glass sheet.

4. The process for determining temper quality in a glass sheet according to claim 1, wherein the laser beam has an output energy level from about 10 watts to about 30 watts during each scoring.

5. The process for determining temper quality in a glass sheet according to claim 1, wherein the laser beam has output energy levels during at least two of the scorings which are different.

6. The process for determining temper quality in a glass sheet according to claim 1, wherein at least two time intervals between the scorings are different.

7. A process for determining temper quality in a glass sheet, comprising the steps of:
A) scoring a major surface of a tempered glass sheet a first number of times with a laser beam; and
B) scoring the major surface of the tempered glass sheet with a laser beam a second number of times sufficient to cause the glass sheet to shatter;
wherein time intervals between the scorings of step A are shorter than the time intervals between the scorings of step B.

8. The process for determining temper quality in a glass sheet according to claim 7, wherein the laser beam is stationary with respect to the glass sheet.

9. The process for determining temper quality in a glass sheet according to claim 7, wherein the laser beam is moved in a direction parallel to the major surface of the glass sheet.

10. The process for determining temper quality in a glass sheet according to claim 7, wherein the laser beam has an energy output level from about 10 watts to about 80 watts during each scoring.

11. The process for determining temper quality in a glass sheet according to claim 7, wherein the laser beam has output energy levels during at least two of the scorings which are different.

* * * * *